US005920268A

United States Patent [19]

Bucci et al.

[11] Patent Number: 5,920,268

[45] Date of Patent: Jul. 6, 1999

[54] KEYLESS ENTRY SYSTEMS FOR USE WITH CONVENTIONAL LOCKSETS

[75] Inventors: George Bucci, Southington; Dominic Caciopoli, East Haven; Teja N. Shariff, Madison, all of Conn.

[73] Assignee: NewTyme, Inc., Branford, Conn.

[21] Appl. No.: 08/729,404

[22] Filed: Oct. 11, 1996

[51] Int. Cl.[6] .......... H04Q 1/00

[52] U.S. Cl. .......... 340/825.31; 340/825.69; 340/825.72; 70/467; 70/472; 70/224; 70/280

[58] Field of Search .......... 340/825.31, 825.69, 340/825.72; 70/467, 472, 224, 280

[56] References Cited

U.S. PATENT DOCUMENTS

| | | | |
|---|---|---|---|
| 4,887,442 | 12/1989 | Lavelle | 70/283 |
| 5,421,178 | 6/1995 | Hamel et al. | 70/283 |
| 5,474,348 | 12/1995 | Palmer et al. | 70/283 |
| 5,712,626 | 1/1998 | Andreou et al. | 340/825.72 |
| 5,816,086 | 10/1998 | Russell, IV | 70/422 |

*Primary Examiner*—Brian Zimmerman
*Assistant Examiner*—Yves Dalencourt
*Attorney, Agent, or Firm*—Maurice M. Klee

[57] ABSTRACT

A keyless entry system for use with conventional locksets is provided. The system employs a battery operated motor and a gear train mounted on the inside of a door. The motor and gear train rotate the inside handle of the lockset in the same manner as a user would rotate the handle to unlatch the door. Misalignments between the gear train and the lockset are accommodated by a pawl which connects the gear train to the connecting shaft between the lockset's inside and outside door handles. The electric motor is activated by a control system responsive to a RF signal generated by a transmitter pendant carried by the user. The RF signal includes a user code, and the control system has a learning mode and an operating mode, with the learning mode serving to record a list of one or more authorized user codes and the operating mode employing that list to determine if the door should be unlatched in response to a particular user code.

26 Claims, 7 Drawing Sheets

KEYLESS ENTRY SYSTEMS FOR USE WITH CONVENTIONAL LOCKSETS

FIELD OF THE INVENTION

This invention relates to keyless entry systems for use with conventional locksets.

BACKGROUND OF THE INVENTION

Keyless entry systems have found great acceptance in the automotive field. Such systems employ a radio transmitter which comprises part of the vehicle's key or is carried by a key fob or pendant. (For ease of reference, the user's transmitter wherever located will be referred to herein as a "transmitter pendant" or simply a "pendant." Also, a key having a radio transmitter will be referred to as an "electronic key.") The transmitter pendant sends a coded signal to a receiver located in the vehicle. The receiver, in turn, activates one or more lock motors associated with the doors and/or trunk of the vehicle. Significantly, the adoption of such systems in the automotive field followed naturally from the use of electric lock motors. With such motors and associated hardware having been fully engineered, e.g., fully designed, tested, and cost optimized, it was relatively straight forward, both from an engineering and an economics point of view, to add a radio based system so that the locks could be operated remotely.

In contrast to the automotive field, most door locks used in other fields, e.g., most residential and commercial door locks, are manually operated. Here the existing engineering base has been directed to optimizing the details of the lockset mechanism to permit large scale production at low cost. Another important difference from the automotive field is the fact that most residential and commercial door locks operate by being rotated, while modern automotive door locks operate by being pulled.

Electrically operated door locks, including remotely operated locks, are, of course, known. See, for example, Johansson et al., U.S. Pat. No. 4,457,148; Austin, U.S. Pat. No. 4,465,311 (pneumatic operation); Beudat et al., U.S. Pat. No. 4,633,688; Uebersax, U.S. Pat. No. 4,745,785; Johansson et al., U.S. Pat. No. 4,770,012; Kerschenbaum et al., U.S. Pat. No. 4,800,741; Corder et al., U.S. Pat. No. 4,802,353; Abend et al., U.S. Pat. No. 4,833,465; Corder et al., U.S. Pat. No. 4,854,143; and Davis et al., U.S. Pat. No. 4,907,429. Such locks, however, are generally too complicated to be produced at a price suitable for widespread residential use. Moreover, such locks typically require special apertures in the door and/or the door jam and thus they cannot be used as replacements for existing locksets. As a result of these limitations, the use of electrically operated door locks has been limited to commercial doors which are specially designed and sell at a high premium compared to standard doors having manual locks.

SUMMARY OF THE INVENTION

In view of the foregoing state of the art, it is an object of this invention to provide a keyless entry system which can be used with conventional locksets and thus can take advantage of the high level of engineering which has already been achieved for such locks. It is also an object of the invention to provide a keyless entry system which can readily replace existing residential and commercial locksets without the need to prepare special apertures in the door or door jam for the system. It is a further object of the invention to provide a keyless entry system wherein the normal functions of a conventional lockset are maintained. Such normal functions include: (1) inside and outside manual operation by rotation; (2) automatic unlocking when rotated from the inside; (3) keyless inside locking by, for example, a twist or push type button carried by, for example, the inside handle; and (4) key operation from the outside.

In addition to the above, it is an object of the invention to provide an improved keyless entry system in which electronic keys (pendants) and locks are matched at the user's location rather than at the manufacturer. In this way, inventory and electronic key replacement problems are minimized. In addition, a single electronic key can be used at multiple locations. Also, a lock for any particular door can selectively allow operation by some electronic keys, but not other electronic keys. These objects of the invention apply to keyless entry systems in general and not just to those designed for use with a conventional lockset. In particular, these objects apply to automotive keyless entry systems.

To achieve these and other objects, the invention in accordance with certain of its aspects provides a motor driven mechanism which is mounted on the inside of a door and which rotates the inside handle of a conventional lockset in the same manner in which a user would rotate the handle to unlatch the lockset. The motor is activated by a control system responsive to a signal transmitted from a remote location, e.g., a RF signal transmitted from outside the door.

Rotation of the inside handle is achieved through rotation of the connecting shaft between the outside door handle and the inside door handle. The shaft has the same configuration as that employed in a conventional lockset of the same design except that the length of the shaft is increased to accommodate the thickness of the motor driven mechanism. Because connecting shafts and their associated components are built to accommodate variations in door carpentry and can be mounted by users with less than high precision, the mechanism of the invention includes misalignment means, e.g., a pawl, which is mounted on the connecting shaft and provides an interface between the motor driven mechanism and the lockset which can accommodate the variations in the location of the connecting shaft and other elements of the lockset seen in practice.

The motor driven mechanism of the invention preferably includes means for detecting the state of the lockset, i.e., latched versus unlatched, and for reporting that state to the control mechanism. The detecting and reporting means can, for example, comprise a mechanical linkage between a limit switch and the mechanism's drive line, with the limit switch being connected to the control system.

In accordance with other aspects of the invention, the control system has a learning mode and an operating mode, with the learning mode serving to record a list of one or more authorized user codes and the operating mode employing that list to determine if the mechanism should be operated in response to a particular user code. In both modes, the control system detects transmitted signals and extracts user codes from the signals. In the learning mode, the extracted user codes are stored in a memory. In the operating mode, the codes are compared to the previously stored user codes, and the mechanism is operated only if a match is found. In the case where the mechanism, including the control system is battery operated, the act of connecting the mechanism to a battery can be used to initiate the learning mode, with that mode being ended and the operating mode begun after a predetermined time has expired since the last entry of a user code into the system's memory.

The learning mode/operating mode aspects of the invention can be used with remotely operated systems in general, e.g., with keyless entry systems used in automobiles. It permits a single transmitter to be used with multiple remotely operated systems, e.g., multiple keyless entry systems, by having the transmitter's user code recorded in the memories of each of the systems during their individual learning periods. Similarly, it allows multiple transmitters to be used with a single remotely operated system by having each of the user codes for the various transmitters recorded in the system's memory during the learning period. It also addresses the problem of matching transmitters to receivers, both from an initial distribution point of view as well as in the case of lost transmitters, since through the learning mode, the ultimate user does the matching, as opposed to the manufacturer.

DESCRIPTION OF THE PREFERRED EMBODIMENTS

Figure 1:
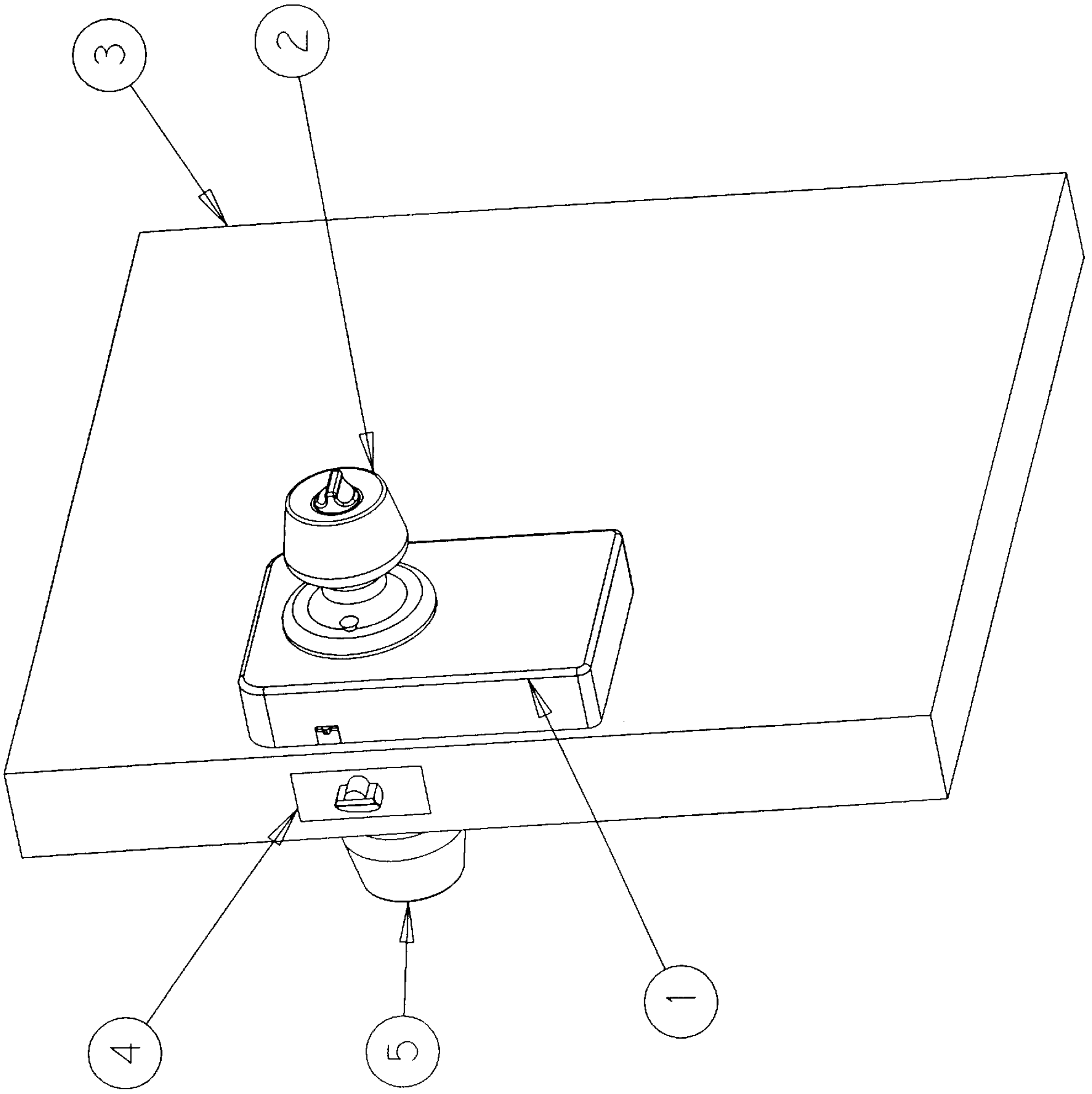
FIG. 1 is a perspective view of a door equipped with the keyless entry system of the invention.

As discussed above, the present invention relates to a keyless entry system for use with a conventional door and lockset. FIG. 1 shows a keyless entry system 1 mounted on door 3 in conjunction with a conventional lockset comprised of outer door knob 5, inner door knob 2, and latch 4. The lockset operates in the conventional manner and thus opens from the outside by means of a key and is controlled on the inside by a lock knob which can leave the lockset in a locked or unlocked condition.

Figure 2:
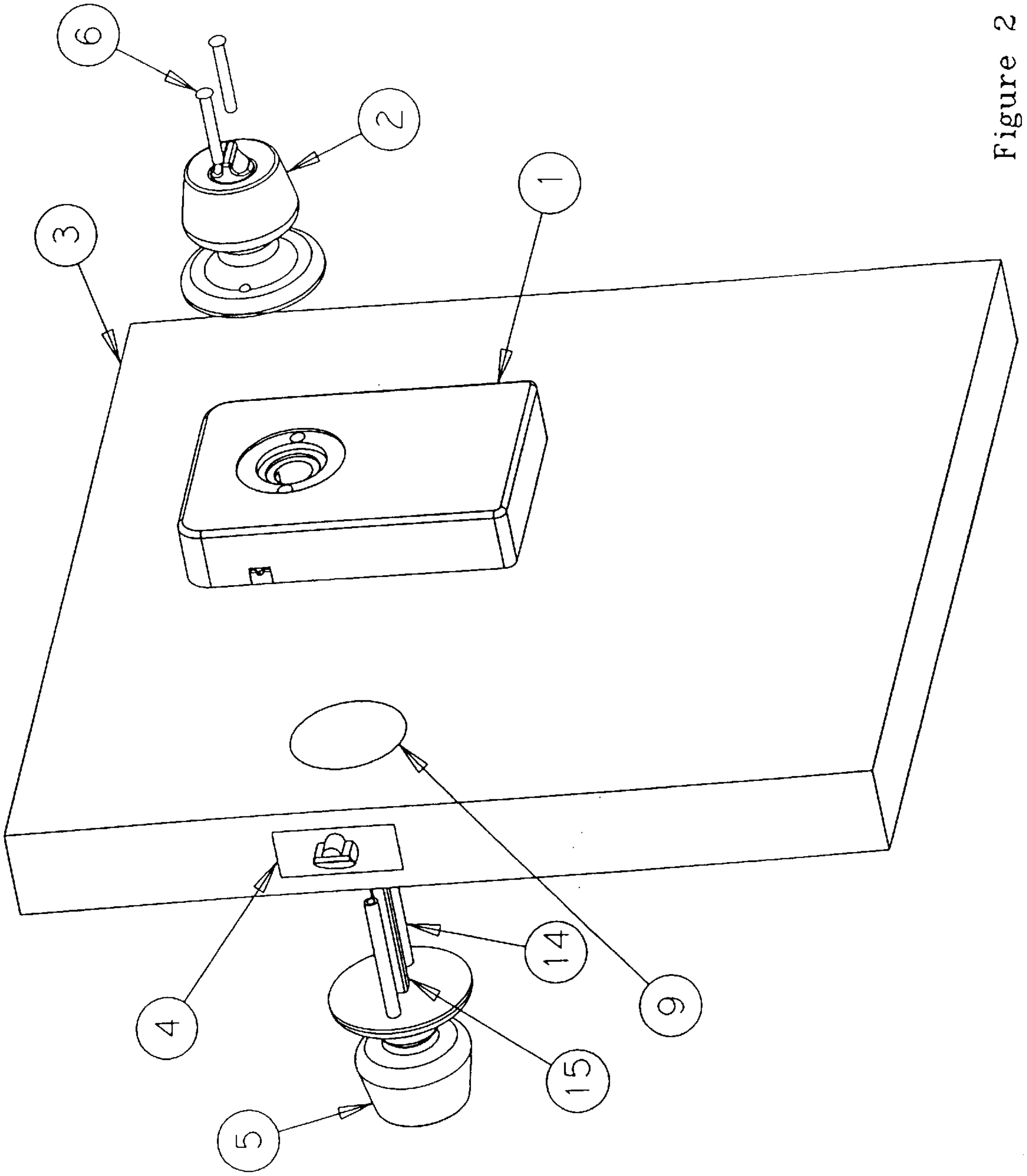
FIG. 2 is an exploded view illustrating user installation of the keyless entry system of the invention.

FIG. 2 shows the keyless entry system of FIG. 1 in more detail. In particular, it shows how a kit embodying the invention can be supplied to a user and then installed. Door 3 includes a standard lock bore 9 for receiving the conventional components of the lockset. Rotatable shaft 15 extends through latch 4 and serves to operatively connect rotatable knobs 2 and 5 to one another, whereby the lockset can be operated in a conventional manner. The lockset and keyless entry system are mounted onto door 3 by means of shafts 14, which extend through bore 9 and through keyless entry system 1, and engage bolts 6. Tightening of bolts 6 firmly secures the knobs and keyless entry system into a finished assembly.

The lockset of FIGS. 1 and 2 is conventional except that shafts 14 and 15 are extended in length by the thickness of keyless entry system 1, e.g., they are about 1 inch (about 2.5 cm) longer than standard. Operation of the lockset is also conventional, except that knob 2 can no longer be turned counterclockwise and knob 5 can no longer be turned clockwise due to the operation of pawl 54 as described below.

Figure 3:
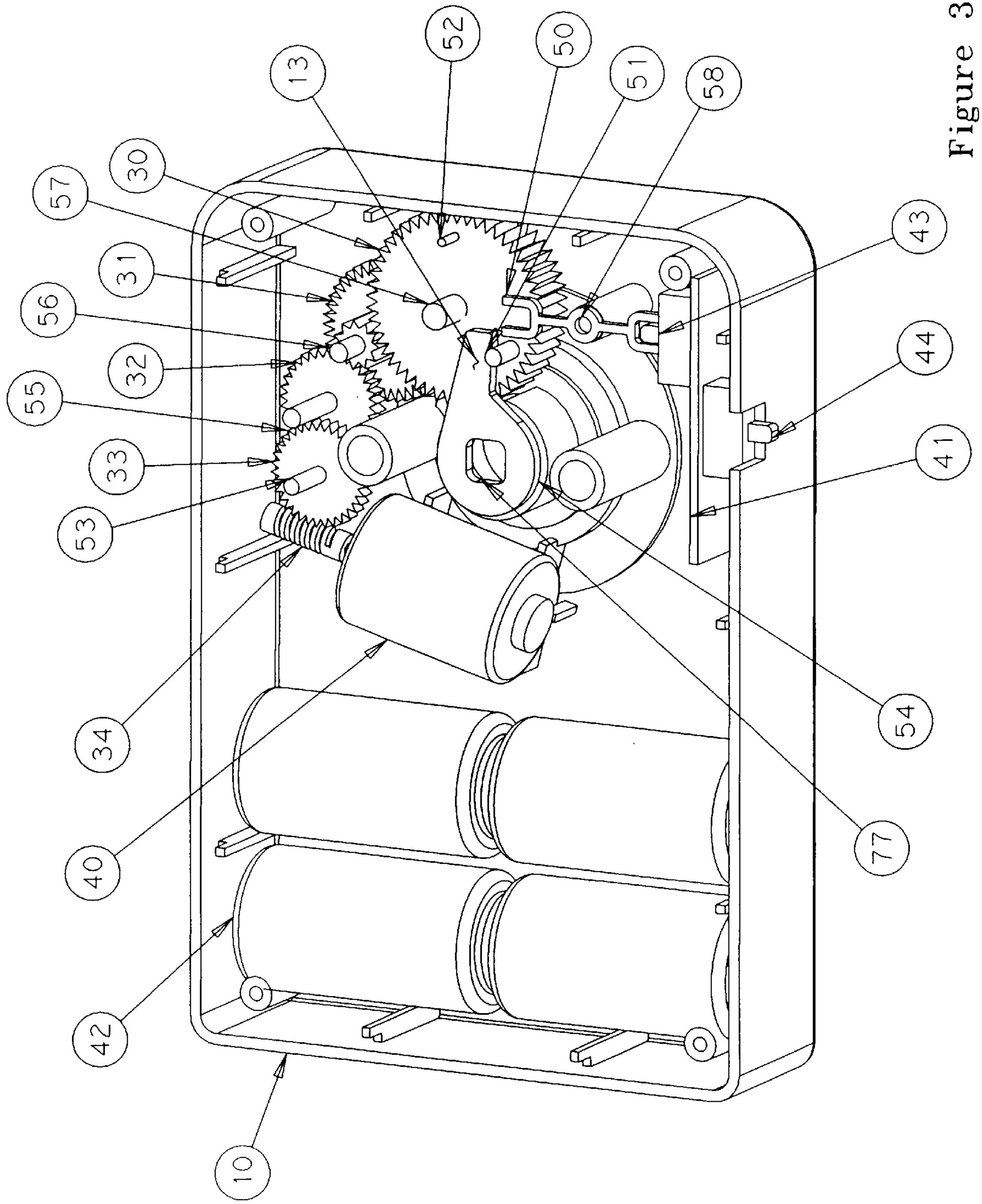
FIG. 3 is a perspective view of the mechanical assembly of the keyless entry system of the invention.
Figure 4:
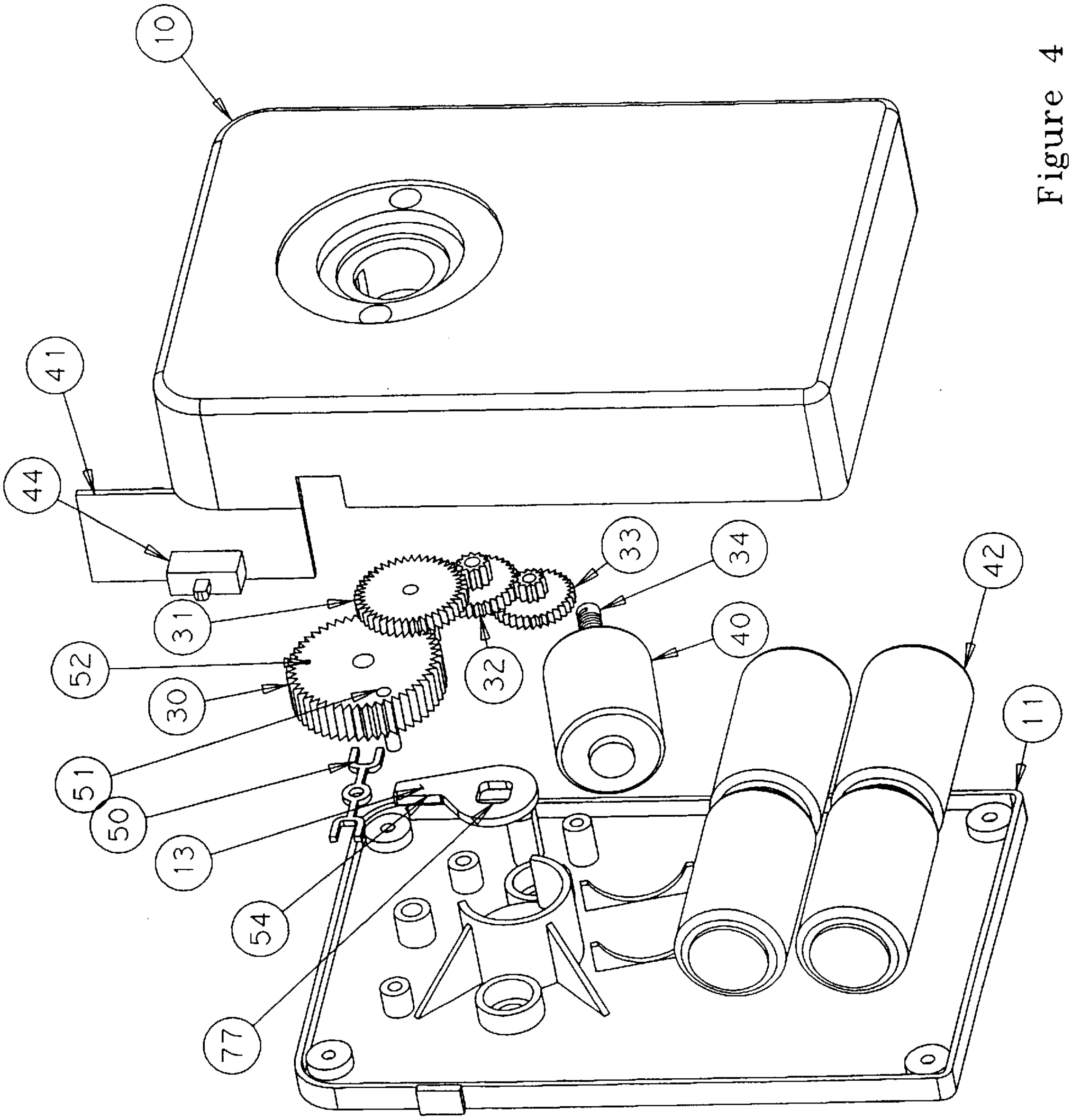
FIG. 4 is an exploded view of the components of FIG. 3.

FIGS. 3 and 4 show keyless entry system 1 in assembled and exploded form, respectively. The system is housed in a case composed of shell 10 and cover 11. Shell 10 carries battery pack 42, electric motor 40 and associated worm gear 34, and gear train 30 through 33. Pinions 53, 55, 56, and 57 extend between cover 11 and shell 10 and serve as shafts for the rotation of gears 30 through 33.

Pawl 54 provides the important function of engaging shaft 15 of the lockset. As discussed above, the location of shaft 15 can vary considerably due to variations in the preparation of door 3 for the lockset by, for example, a carpenter. Accordingly, shaft 15 cannot be directly connected to gear train 30 through 33 without the danger of misalignment and jamming. Pawl 54 solves this problem by providing an interface between the high precision gear train and the lockset. Pawl 54 does so by means of square hole 77 which engages shaft 15 and pawl tongue 13 which contacts pin 51 of gear 30. The tongue/pin interface provides the necessary tolerances to accommodate variations in the geometry of the lockset as mounted on door 3. It also allows the door to be operated normally by a user since the tongue can always be rotated off of the pin by rotating the inner door knob or the outer door knob if the lockset is unlocked.

It should be noted that the hole in pawl 54 need not be square. Rather, it merely needs to match the cross-sectional geometry of the connecting shaft used in the lockset. Examples of such geometries include “D” shapes, half moons, rectangles, and the like. Similarly, other types of misalignment means besides a pawl can be used. Examples include building a gear train with a low tolerance hub which surrounds shaft 15. For example, the final gear of the gear train can include an outer bearing which has a set of female spaces and a floating inner hub which engages shaft 15 and has a set of pins which are received in the female spaces and allow the shaft to be driven, while at the same time allowing for misalignments of the shaft relative to the remainder of the gear train. Other alternatives include rigidly attaching the motor and gear train to shaft 15 and floating the entire mechanism with respect to shell 10.

In addition to contacting tongue 13 of pawl 54, pin 51 also contacts switch actuator 50 which is pivoted at hub 58. Switch actuator 50, in turn, is connected to two position switch 43. A second pin 52 also contacts switch actuator 50. Two position switch 43 functions as a limit switch to provide reference information regarding the position of gear 30 and thus of pawl 54 and shaft 15. In particular, when gear 30 has rotated shaft 15 to its unlatched position by means of pawl 54, pin 52 moves switch 43 into its “latch is open” position which indicates that the lockset is unlatched. On the other hand, when gear 30 has rotated shaft 15 to its latched position, again by means of pawl 54, pin 51 moves switch 43 into its “latch is closed” position which indicates that the lockset is latched.

Switch 43 is carried by circuit board 41 which also contains the electronic components of the system as described below. Board 41 also preferably carries on-off switch 44 which allows the user to completely disable the keyless entry system.

Figure 5:
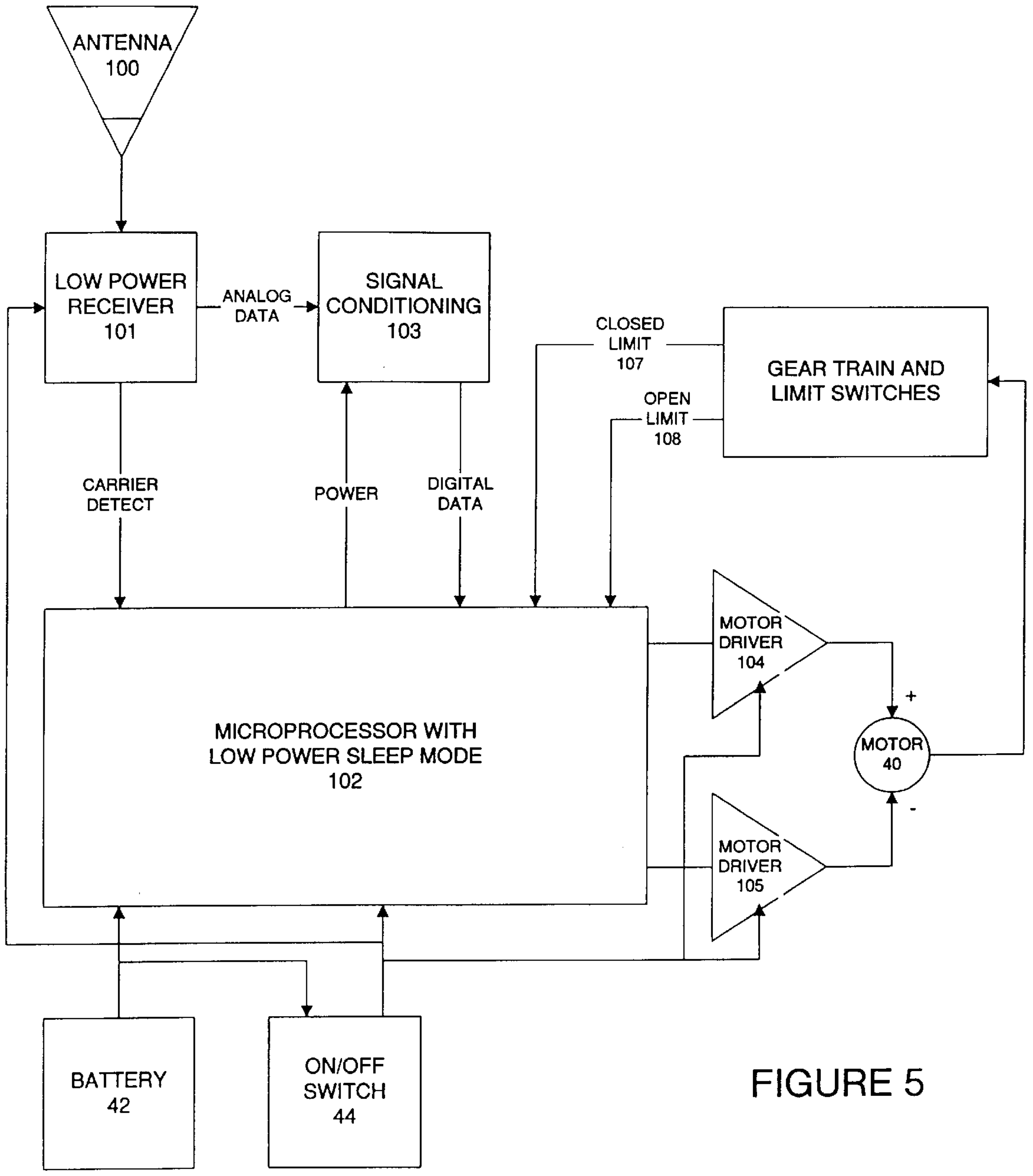
FIG. 5 is a block diagram of the electronic assembly of the keyless entry system of the invention.

FIG. 5 is an overall block diagram of the electronic assembly of the system. The block diagram of this figure is used with a pendant which transmits a RF signal, e.g., a signal in the 300 megahertz range, which is modulated with a digital user code. The modulation, for example, can be AM or FM modulation. Signals other than RF signals can be used in the practice of the invention, examples of which include infrared, acoustic, and magnet signals. For some of these modalities, detection of the signal will need to be performed on the outside of the door. Accordingly, RF signals are preferred since they can penetrate non-metal structures, including non-metal structures surrounding a door, and thus can normally be detected on the inside of a door, whether the door is made of wood, metal, or glass.

The electronic assembly of FIG. 5 includes antenna 100 which is connected to low power receiver 101. Low power receiver designs can employ SAW (surface acoustic wave) or LC filters along with a low power RF amplifier. Low power receiver 101 takes an input signal and produces two signals, namely, an analog data signal which contains the user code in analog form and a digital carrier signal which indicates the presence of a RF signal at the antenna.

The digital carrier signal is provided to microprocessor 102. The microprocessor preferably has a low power sleep mode so that the consumption of power during periods when the keyless entry system is not in use is minimized. Various microprocessors available from, for example, Motorola, National Semiconductor, and Intel, have such a sleep mode feature and can be used in the practice of the invention. The microprocessor also includes a memory for storing user codes (see below). Preferably, the microprocessor is of the CMOS type so that its power consumption when active or inactive is low. It can have a RAM of approximately 64 bytes, a ROM of approximately 1 kilobyte, a word length of 8 bits, and a cycle time greater than about 1 megahertz.

Upon receipt of a digital carrier signal from low power receiver 101, microprocessor 102 supplies power to signal conditioning circuit 103. This circuit amplifies and detects the analog data signal produced by receiver 101. More particularly, this circuit produces a digital data stream useable by the microprocessor from the analog signal. Various circuits can be used for this purpose, examples of which include low power operational amplifiers in conjunction with filter capacitors to provide filtering and clipping. The resulting clean digital signal extracted from the RF signal by low power receiver 101 and signal conditioning circuit 103 is provided to microprocessor 102. Other means know in the art for extracting digital signals from transmitted signals can, of course, be used if desired. The processing of the extracted digital signal depends on whether the system is in its learning mode (first condition) or its normal or operational mode (second condition). These modes are discussed below in connection with FIGS. 6 and 7, respectively.

In addition to its connections to low power receiver 101 and signal conditioning circuit 103, microprocessor 102 is also connected to motor drivers 104 and 105 which are, in turn, connected to motor 40. Motor drivers 104 and 105 preferably comprise N and P channel FETs to provide isolation between the motor and the microprocessor and to carry the relatively high motor currents. The motor drivers are connected directly to battery pack 42 through on-off switch 44. As shown in FIG. 5, the on-off switch is also connected to low power receiver 101, and the battery pack is connected to microprocessor 102. Motor 40 is connected to the gear train of FIGS. 3 and 4, and the gear train is connected to the limit switch of these figures. The limit switch provides closed and open signals to the microprocessor on lines 107 and 108.

Figure 6:
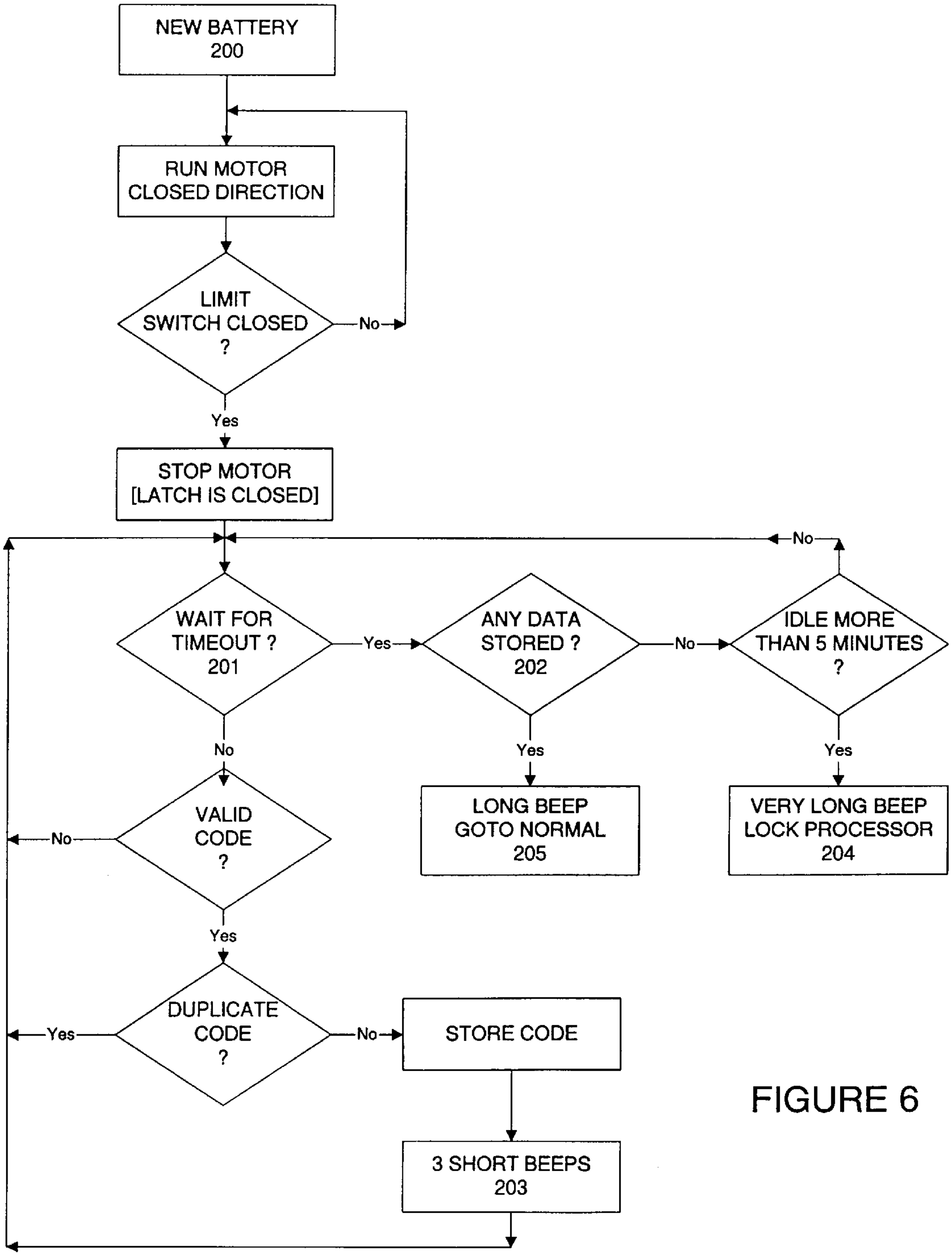
FIG. 6 is a flow chart showing startup operation of the system of the invention.

The operation of the circuit of FIG. 5 during a learning mode is shown in the flow chart of FIG. 6. As shown in box 200, the replacement of battery pack 42 is used as starting point for the learning mode. Upon the insertion of a battery, the system runs motor 40 in a latched closed direction until limit switch 43 indicates that the latch is in fact closed. This ensures that the starting point for the system is always the same.

Microprocessor 102 then proceeds to wait for incoming data transmitted from a pendant as shown in box 201. If a valid user code is detected, i.e., a user code whose format is of the type which the microprocessor expects to receive, that code, if not a duplicate of a previously stored code, is stored in the microprocessor's RAM memory and the system emits a audible signal, e.g., 3 short beeps, to show that a successful recording of a user code was made (see box 203; the beeps can be produced using, for example, a low power piezoelectric device). The system then returns to box 201 and waits for the input of further user codes.

After a period of time without receipt of a further user code, e.g., 1 minute, the system proceeds to box 202 where it determines if any user codes have been recorded. If none have been recorded, the system proceeds to wait for a further period of time, e.g., 5 minutes, and if still no valid codes have been received, the system emits an audible signal, e.g., a very long beep, and proceeds to lock out all of the microprocessor's functions (see box 204). In this condition, the microprocessor can only be brought back to life by removing the battery pack, allowing any capacitors in the system to discharge, and then replacing the battery pack to restart the learning mode.

Figure 7:
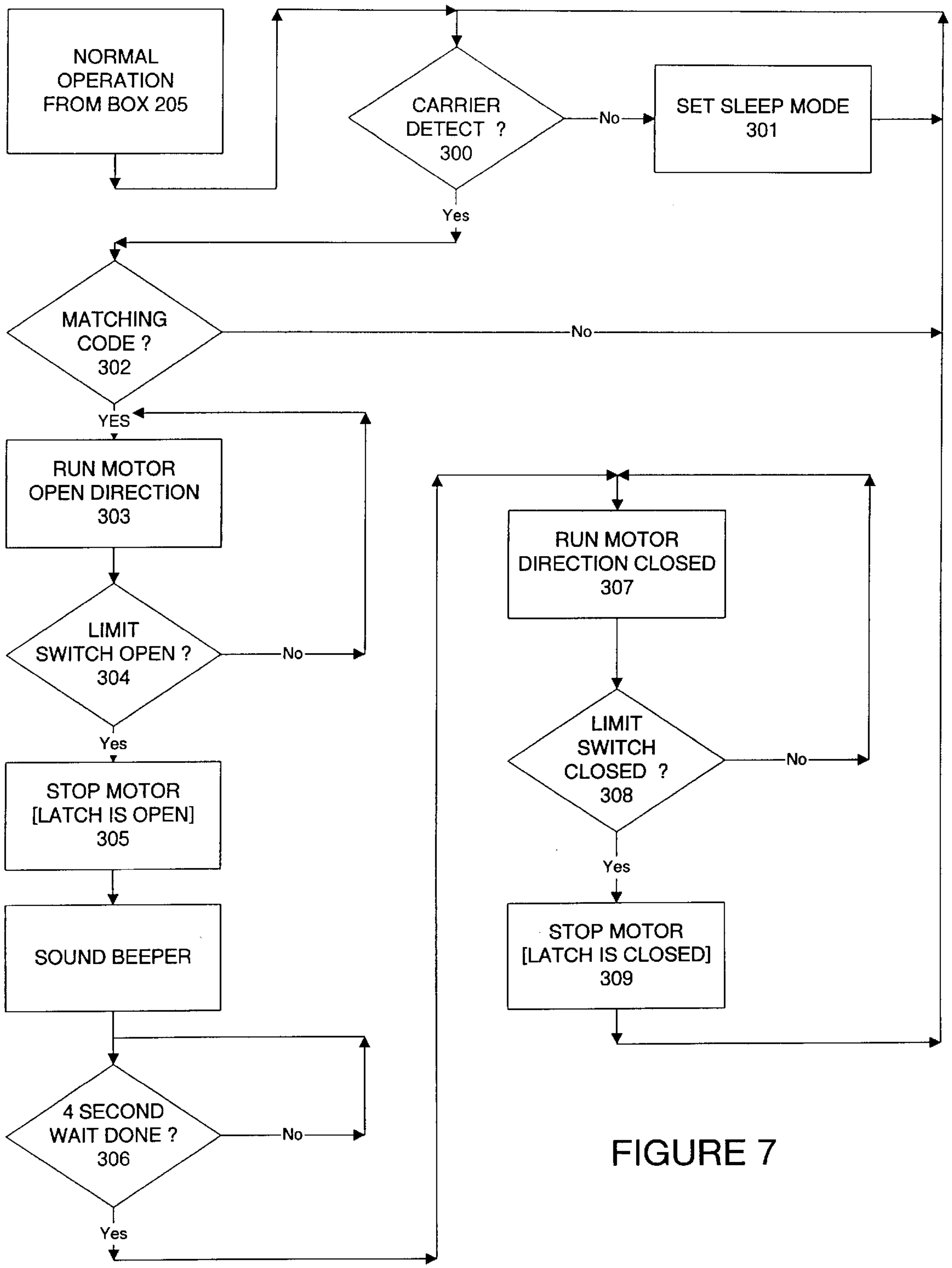
FIG. 7 is a flow chart showing normal operation of the system of the invention.

If at box 202, the system determines that one or more valid user codes have been stored in the microprocessor's RAM, an audible signal is emitted, e.g., a long beep, and the system proceeds to the normal operating mode of FIG. 7 (see box 205).

Boxes 300–301 of FIG. 7 represent the stand-by, low power condition of the system during its normal operating mode. During this time, the system uses low power receiver 101 to determine if any RF signal is present. If no signal is detected, the system remains in its sleep mode and continually cycles between boxes 300 and 301. To conserve power such cycling can be at a clock rate slower than that of the microprocessor. Alternatively, low power receiver 101 can be connected to an "interrupt" pin on a microprocessor specifically designed for sleep/wake-up in which case the microprocessor can be completely shut down until the receiver detects a RF signal and provides a wake-up signal to the "interrupt" pin.

If a RF signal is detected, the microprocessor is brought out of its sleep mode and activates signal conditioning circuit 103. The output of that circuit is then compared to the user codes stored in the microprocessor's RAM (see box 302). If no matching code is found, the system returns to its carrier detect/sleep mode status.

If a matching code is found, the system proceeds to run motor 40 in its open direction until limit switch 43 indicates that the latch is open, whereupon the motor is stopped (see boxes 303–305). The system can then emit an audible signal, e.g., a beep, to indicate that the latch is open. If desired, the system can be equipped with a plunger which engages the door jam and pushes the door open under these conditions. However, the use of such a plunger can require modifications to the door which may be undesirable for some users.

As shown in box 306, after a predetermined time, e.g., 4 seconds, the microprocessor operates motor 40 in the closed direction until limit switch 43 indicates that the latch is closed, whereupon the motor is stopped (see boxes 307–309). The system then returns to its carrier detect/sleep mode status (boxes 300–301).

Although specific embodiments of the invention have been described and illustrated, it is to be understood that modifications can be made without departing from the invention's spirit and scope. For example, instead of having the microprocessor automatically return the lockset to its latched position, the microprocessor can leave the lockset in its unlatched position until another signal is received from the user's pendant. Similarly, the microprocessor can be programmed to emit an audible sound, e.g., a chirp like a smoke detector, when battery power is low.

A variety of other modifications which do not depart from the scope and spirit of the invention will be evident to persons of ordinary skill in the art from the disclosure herein. The following claims are intended to cover the specific embodiments set forth herein as well as such modifications, variations, and equivalents.

What is claimed:

1. Apparatus for operating a lockset which comprises a lockset body and a latch, said lockset having (1) a latch closed state in which the latch is extended from the lockset body, (2) a latch open state in which the latch is retracted into the lockset body, and (3) a rotatable inside handle which, upon rotation, transfers the lockset from its latch closed state to its latch open state, said apparatus comprising:

(A) an electric motor;

(B) control means for activating the electric motor in response to a signal transmitted from a remote location; and (C) drive means associated with the electric motor for rotating the inside door handle when the control means activates the electric motor to transfer the lockset to its latch open state.

2. The apparatus of claim 1 wherein:

(i) the lockset has a rotatable outside handle and an elongated rotatable shaft which connects the rotatable inside handle to the rotatable outside handle; and (ii) the drive means comprises misalignment means for mounting on the elongated rotatable shaft.

3. The apparatus of claim 2 wherein the misalignment means is a pawl.

4. The apparatus of claim 1 wherein said transmitted signal includes a user code and the control means comprises:

(i) memory means for storing one or more user codes;

(ii) detecting means for detecting a transmitted signal;

(iii) extracting means for extracting a user code from the detected signal;

(iv) storing means operable under a first condition for storing a user code obtained by the extracting means in the memory means; and (v) comparing means operable under a second condition for comparing a user code obtained by the extracting means with the one or more user codes stored in the memory means by the storing means.

5. The apparatus of claim 4 wherein the apparatus is battery operated and the first condition is established by the act of connecting the battery to the apparatus.

6. The apparatus of claim 1 wherein the control means has a sleep mode and an awake mode and is transferred from the sleep mode to the awake mode in response to the signal transmitted from a remote location.

7. The apparatus of claim 1 wherein the transmitted signal is a RF signal.

8. The apparatus of claim 1 wherein the lockset includes a rotatable outside handle and locking means for preventing rotation of the outside handle while allowing rotation of the inside handle when the lockset is in its latch closed state.

9. Apparatus for operating a lockset which comprises a lockset body and a latch, said lockset having (1) a latch closed state in which the latch is extended from the lockset body, (2) a latch open state in which the latch is retracted into the lockset body, (3) a rotatable inside handle, (4) a rotatable outside handle, and (5) an elongated rotatable shaft which connects the rotatable inside handle with the rotatable outside handle, said apparatus comprising:

(A) an electric motor;

(B) control means for activating the electric motor;

(C) misalignment means for mounting on the elongated rotatable shaft; and (D) gear means connected between the electric motor and the misalignment means for rotating the misalignment means when the control means activates the electric motor.

10. The apparatus of claim 9 wherein:

(i) the electric motor can be operated in a first direction and a second direction, with operation in the first direction causing the misalignment means to rotate in a direction which transfers the lockset from its latch closed state to its latch open state and operation in the second direction causing the misalignment means to rotate in a direction which transfers the lockset from its latch open state to its latch closed state; and (ii) the control means controls the direction of operation of the electric motor.

11. The apparatus of claim 10 wherein: the gear means has a first state corresponding to the latch closed state of the lockset and a second state corresponding to the latch open state of the lockset; and the apparatus further comprises detecting means associated with the control means for detecting the state of the gear means.

12. The apparatus of claim 11 wherein the detecting means comprises a limit switch and a mechanical linkage which connects the gear means to the limit switch.

13. The apparatus of claim 9 wherein the misalignment means is a pawl.

14. Apparatus using a transmitted signal to remotely operate a system, said signal including a user code, said apparatus comprising:

(A) memory means for storing one or more user codes;

(B) detecting means for detecting the transmitted signal;

(C) extracting means for extracting a user code from the detected signal;

(D) storing means operable under a first condition for storing a user code obtained by the extracting means in the memory means;

(E) comparing means operable under a second condition for comparing a user code obtained by the extracting means with the one or more user codes stored in the memory means by the storing means; and (F) a transmitter which generates the transmitted signal both under the first condition and under the second condition.

15. The apparatus of claim 14 wherein the apparatus is battery operated and the first condition is established by the act of connecting the battery to the apparatus.

16. The apparatus of claim 14 wherein said apparatus has a sleep mode and an awake mode and is transferred from the sleep mode to the wake mode when the detecting means detects a transmitted signal.

17. The apparatus of claim 14 wherein the transmitted signal is a RF signal.

18. The apparatus of claim 14 wherein the system is a keyless entry system.

19. A method for remotely operating a lockset which comprises a lockset body and a latch, said lockset having (1) a latch closed state in which the latch is extended from the lockset body, (2) a latch open state in which the latch is retracted into the lockset body, and (3) a rotatable inside handle which, upon rotation, transfers the lockset from its latch closed state to its latch open state, said method comprising:

(A) detecting a signal transmitted from a remote location, said signal including a user code;

(B) extracting the user code from the detected signal;

(C) determining if the user code is an authorized user code; and (D) if the user code is an authorized user code, activating an electric motor to rotate the inside handle to transfer the lockset to its latch open state.

20. The method of claim 19 wherein the method further includes the step before step (A) of creating a list of authorized user codes by:

(i) detecting at least one transmitted signal;

(ii) extracting a user code from each of the detected signals; and (iii) storing each of the extracted user codes in a memory, said stored user codes constituting the list of authorized user codes.

21. The method of claim 19 comprising the additional step of providing a sleep mode and an awake mode to minimize power consumption.

22. The method of claim 19 wherein the transmittal signal is a RF signal.

23. A method for using a transmitted signal to remotely operate a system, said signal including a user code, said method comprising:

(A) providing a learning mode which comprises detecting one or more transmitted signals, extracting a user code from each detected signal, and storing the extracted user code in a memory; and (B) providing an operating mode which comprises detecting transmitted signals, extracting a user code from each detected signal, comparing the extracted user code with the one or more user codes stored in the memory during the learning mode, and operating the system only when the extracted user code matches a user code stored in the memory;

wherein the one or more transmitted signals of learning step (A) are generated by a set of one or more transmitters and the transmitted signals of operating step (B) are generated by one or more members of the same set.

24. The method of claim 23 comprising the additional step of providing a sleep mode and an awake mode to minimize power consumption.

25. The method of claim 23 wherein the transmitted signal is a RF signal.

26. The method of claim 23 wherein the system is a keyless entry system.

* * * * *